HEAT STABILIZATION OF POLYIMIDES FORMED FROM 3,4 - DICARBOXY-1,2,3,4-TETRAHYDRO-1-NAPHTHALENE SUCCINIC DIANHYDRIDES AND DIPRIMARY DIAMINES Howard Robert Lucas, Danbury, Conn., assignor to American Cyanamid Company, Stamford, Conn.
No Drawing. Filed Apr. 1, 1971, Ser. No. 130,525
Int. Cl. C08g 51/62
U.S. Cl. 260—32.6 N    7 Claims

ABSTRACT OF THE DISCLOSURE

There is provided a heat-stabilized resinous polyimide obtained by incorporating into an inert organic solid solution of a polyimide resinous reaction product of 3,4-dicarboxy - 1,2,3,4 - tetrahydro - 1 - naphthalene succinic dianhydride (Tetralin dianhydride) and a diprimary diamine, a small but effective stabilizing quantity of either ferrocene or benzoyl ferrocene ranging from about 0.25% to about 2.5%, based on the weight of the polyimide solids.

---

The present invention relates to a heat-stabilized resinous polyimide and to a process for obtaining the same. More particularly, it relates to a heat stabilized resinous polyimide reaction product of Tetralin dianhydride and a di-primary diamine. Still more particularly, the invention is concerned with the use of ferrocene or benzoyl ferrocene as a heat stabilizer for a resinous polyimide reaction product of Tetralin dianhydride and a di-primary diamine polyimide.

Resinous Tetralin dianhydride - di - primary diamine polyimide reaction products are known. In general, the method involves the reaction of equimolar amounts of 3,4 - dicarboxy - 1,2,3,4 - tetrahydro - 1 - naphthalene succinic dianhydride (sometimes called Tetralin dianhydride and abbreviated "TDA") having the structure:

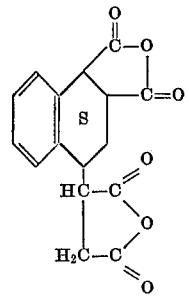

and a di-primary diamine, such as 4,4'-methylenedianiline or 4,4'-oxydianiline, under conditions set forth in United States Letters Pat. Nos. 3,489,725 and 3,501,443 which are incorporated herein by reference. Although the so-formed polyimide has greatly improved molding properties, since it can be, for example, extruded at temperatures below its decomposition point employing atmospheric pressure, the molded product nonetheless is not entirely satisfactory because it does not retain its desirable properties on prolonged exposure to heat and the atmosphere.

If the polyimide can be so stabilized, particularly in the form of thinly molded articles, say from 1 to 2 mils in thickness, such would fulfill a long felt need in the art.

It has been unexpectedly found that particular organometallic compounds, when intimately admixed with a solid solution containing from 60% to 95% of a polyimide as prepared in the aforementioned patents, will cause enhancement of resultant molded products with respect to heat stability as evidenced by improved tensile strength and flexural strength. Molded articles prepared from a TDA-polyimide solution containing small amounts of admixed ferrocene or benzoyl ferrocene therein exhibit properties hitherto unavailable.

According to the process of the present invention, there is intimately admixed a Tetralin dianhydride-di-primary diamine polyimide reaction product in the form of a solid solution and a small but effective stabilizing amount of either ferrocene or benzoyl ferrocene. The solid solution mixture containing at least 60% solids content of the polyimide in an inert solvent, such as acetophenone, dimethylformamide or equivalents thereof, may be employed in an extruder to ultimately form a molded article of substantially reduced deterioration due to heat.

It is a good practice of the invention to employ as the small but effective stabilizing amount, a well-known ferrocene such as ferrocene or benzoyl ferrocene, ranging from about 0.25% to about 2.50%, or even higher, and preferably from 0.8% to 1.2%, based on the weight of the TDA-di-primary-diamine polyimide reaction product.

The following examples will further illustrate the invention but are not deemed to be limitative thereof, except as indicated in the appended claims. All parts and percentages are by weight unless otherwise specified.

EXAMPLE 1

According to the requirements of A.S.T.M. D-638 and D-790, six molded test samples were prepared by molding a TDA-4,4'-methylenedianiline polyimide from a 70% solids solution containing said polyimide.

Two of the samples prepared did not contain any ferrocene additive and were labeled "A" and "B." Two of the four remaining samples were prepared by incorporating 1%, by weight, of ferrocene into the polyimide solution prior to extrusion and molding. These were labeled "C" and "D," respectively. The remaining two samples, labeled "E" and "F," were prepared by incorporating 1%, by weight, of benzoyl ferrocene into the polyimide solution prior to extrusion and molding. All the samples were exposed to 400° F. for from zero (0) to five hundred (500) hours and tested for tensile and flexural strengths.

The results are tabularized below in Table I.

TABLE I.—TENSILE STRENGTH
[In p.s.i.]

| | Hours aged at 400° F. | | |
|---|---|---|---|
| | 0' | 100 | 500 |
| Sample: | | | |
| A (control) | 16,000 | 9,200 | 5,300 |
| C (1% ferrocene) | 16,800 | 14,000 | 14,900 |
| E (1% benzoyl ferrocene) | 17,500 | ---------- | 12,500 |

Flexural strength (in p.s.i.)

| Sample: | | | |
|---|---|---|---|
| B (control) | 23,800 | 9,700 | 5,300 |
| D (1% ferrocene) | 24,700 | 16,900 | 17,700 |
| F (1% benzoyl ferrocene) | 24,300 | ---------- | 14,400 |

EXAMPLE 2

Repeating the procedure of Example 1 in every detail except that the test samples are prepared by employing TDA-oxydianiline (65%) solid solution in which 0.8% of ferrocene and benzoyl ferrocene are separately incorporated. Similar results as shown in Example 1 are obtained.

Although resinous TDA-methylenedianiline and TDA-oxydianiline polyimides have been exemplified herein, it should be understood that any polyimide resinous reaction product of any di-primary diamine and 3,4-dicarboxy - 1,2,3,4 - tetrahydro - 1 - naphthalene succinic dianhydride may be heat-stabilized by the process of the invention.

I claim:

1. A heat stabilized polyimide solid solution wherein said polyimide is derived from 3,4 - dicarboxy - 1,2,3,4-tetrahydro naphthalene succinic dianhydride and a diprimary diamine and constitutes at least 60% solids content of the solvent, containing from about 0.25% to about 2.5% of ferrocene or benzoyl ferrocene, based on the weight of the polyimide.

2. The solid solution of claim 1 in which 1% of ferrocene is added.

3. The solid solution of claim 1 in which 1% of benzoyl ferrocene is added.

4. The solid solution of claim 1 in which the diprimary diamine is 4,4'-methylenedianiline.

5. The solid solution of claim 1 in which the diprimary diamine is 4,4'-oxydianiline.

6. A heat-stabilized molded article formed from the solid solution containing ferrocene of claim 1.

7. A heat-stabilized molded article formed from the solid solution containing benzoyl ferrocene of claim 1.

References Cited
UNITED STATES PATENTS

| | | | |
|---|---|---|---|
| 3,287,314 | 11/1966 | Van Vliet | 260—45.75 |
| 3,501,443 | 3/1970 | Leone | 260—78 |
| 3,437,634 | 4/1969 | Neuse | 260—45.75 |
| 3,461,287 | 8/1969 | Rai | 260—45.75 |
| 3,462,533 | 3/1969 | Rosenberg | 260—45.75 |
| 3,422,130 | 1/1969 | Rosenberg | 260—45.75 |

DONALD E. CZAJA, Primary Examiner

V. P. HOKE, Assistant Examiner

U.S. Cl. X.R.

260—32.8 N, 45.75 R, 78 S